Figure 1:
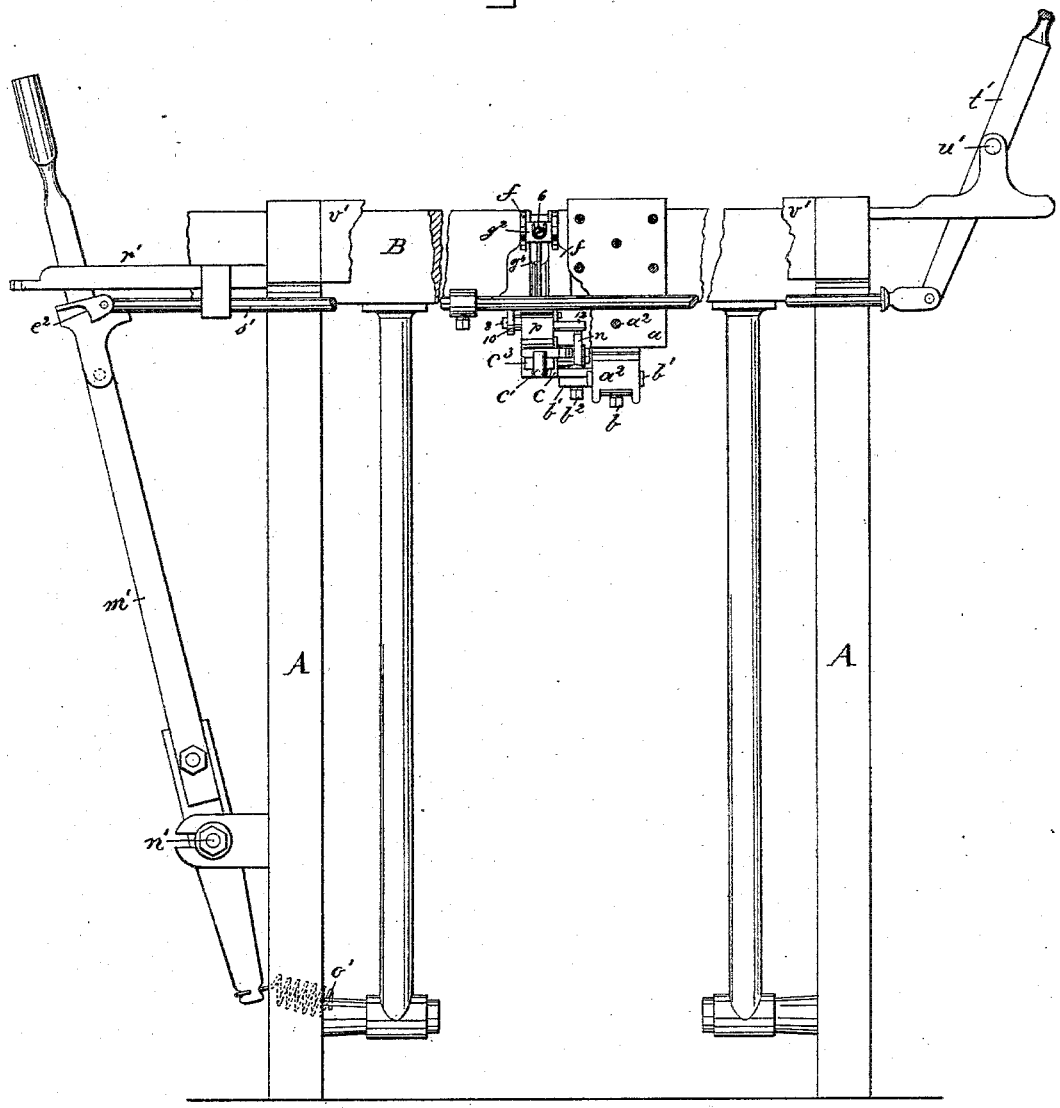

(No Model.)
2 Sheets—Sheet 1.

G. CROMPTON & H. WYMAN.
WEFT STOP MECHANISM FOR LOOMS.

No. 301,574. Patented July 8, 1884.

Witnesses.
Fred. A. Powell.
John F. C. Prentkert.

Inventors.
George Crompton and Horace Wyman
by Crosby Gregory attys.

(No Model.)  2 Sheets—Sheet 2.
G. CROMPTON & H. WYMAN.
WEFT STOP MECHANISM FOR LOOMS.
No. 301,574. Patented July 8, 1884.
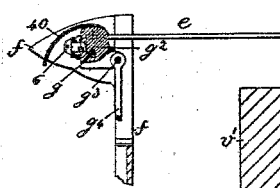
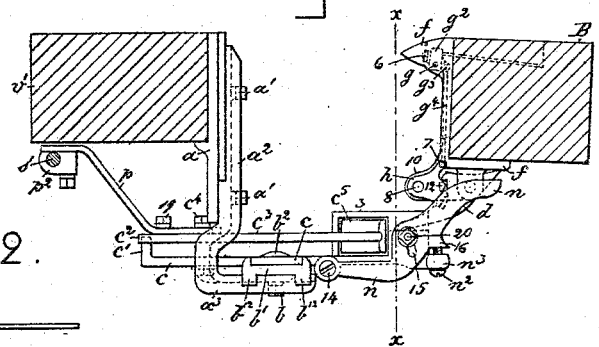
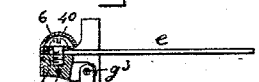
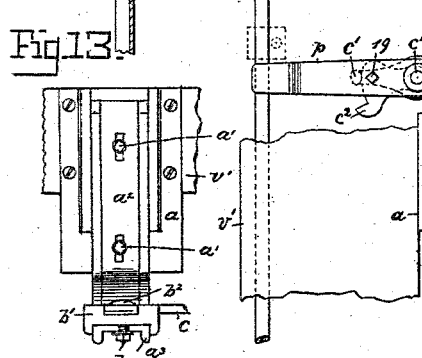
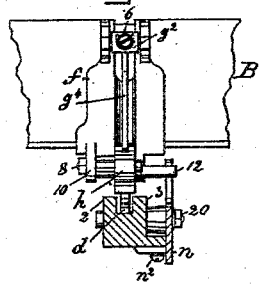
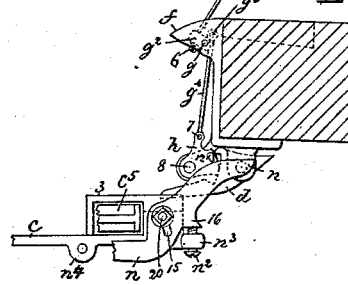
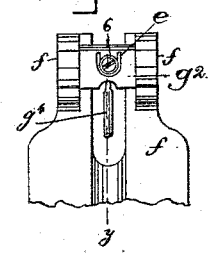
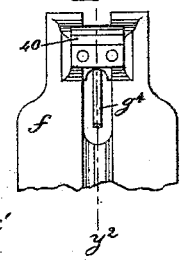
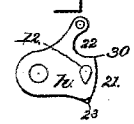
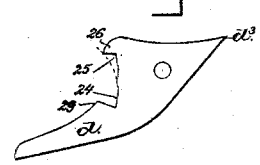
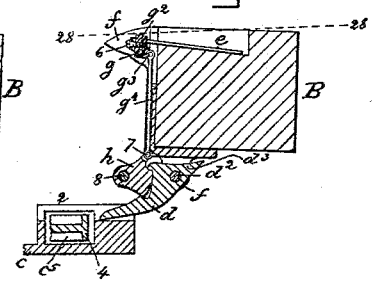
Witnesses.
Fred A. Powell
John F. C. Preinkert
Inventors.
George Crompton & Horace Wyman
by Crosby & Gregory attys.

UNITED STATES PATENT OFFICE.

GEORGE CROMPTON AND HORACE WYMAN, OF WORCESTER, MASSACHUSETTS; SAID WYMAN ASSIGNOR TO SAID CROMPTON.

WEFT-STOP MECHANISM FOR LOOMS.

SPECIFICATION forming part of Letters Patent No. 301,574, dated July 8, 1884.

Application filed November 6, 1882. (No model.)

*To all whom it may concern:*

Be it known that we, GEORGE CROMPTON and HORACE WYMAN, of Worcester, county of Worcester, State of Massachusetts, have invented an Improvement in Weft-Stop Mechanism for Looms, of which the following description, in connection with the accompanying drawings, is a specification.

This invention has for its object the production of a simple and efficient weft-stop mechanism for looms; and our invention consists in certain novel constructions and combinations of parts, as will be hereinafter described, and pointed out in the claims.

Figure 1 represents a broken front elevation of a sufficient portion of a loom to illustrate the application of our improved weft-stop mechanism thereto. Fig. 2 represents in vertical section part of the breast-beam and lay with our weft-stop mechanism added. Fig. 3 is a top view of Fig. 2. Fig. 4 is a sectional detail on the line $x\,x$, Fig. 2, looking at the front of the lay-beam. Figs. 5 and 6 are details, partially in section, the first-named being taken on the line $x'\,x'$, Fig. 3, showing the feeler in two different positions; Fig. 7, a detail of finger $d$; Fig. 8, a detail of lever $h$. Fig. 9 is an enlarged partial front view of the bracket which holds the weft-feeler block or head; Fig. 10, a section of Fig. 9 on the dotted line $y$. Fig. 11 is an enlarged view of a modification, showing a different manner of uniting the weft-feeler with its pivot; Fig. 12, a section of Fig. 11 on the dotted line $y^2$; and Fig. 13, a detail showing parts of the breast-beam, guide-plate, and bracket.

The loom-frame A, breast-beam $v'$, lay B, shipper-lever $m'$, handle $t'$, pivoted at $u'$, rod $s'$, connecting said handle $t'$ with the shipper-lever $m'$, notched guide-plate $r'$, the pivoted block $e^2$, pivot $n'$, and spring $o'$, are substantially as in our United States Patent No. 265,659, dated October 10, 1882, so need not be herein further particularly described.

The breast-beam $v'$, at its inner side, and preferably near its center, has attached to it a guide-plate, $a$, upon which a bracket, $a^2$, is adjustably secured by bolts $a'$, passing through slots in the bracket, the latter having a horizontal slotted foot, $a^3$, upon which is adjustably held by bolt $b$ the shoe $b'$, and upon which in turn is secured by a bolt, $b^2$, the base-plate $c$, slotted at 32. The bracket $a^2$ so held may be adjusted vertically. Its slotted foot permits the shoe $b'$ to be adjusted horizontally toward and from the lay when the bolt $b$ is loosened, and the slot 32 in the base-plate $c$ permits the latter to be adjusted laterally toward the loom side when the bolt $b^2$ is loose. The shoe $b'$ has inwardly-extended lugs $b^{10}$ at its sides to receive the slotted portion of the base-plate, and has downwardly-projecting lugs $b^{12}$ at its ends (see Fig. 2) to embrace the foot $a^3$ of the bracket $a^2$. This shoe assists in steadying the parts; but it may be omitted, in which case the base-plate will rest directly upon the slotted foot of the bracket $a^2$, and bolt $b^2$ will be extended through the slot in the said foot $a^3$. This base-plate $c$ at one end has a stop, $c'$, against which strikes the shoulder $c^2$ of a dagger-lever, $c^3$, mounted on a stud, $c^4$, rising from the plate $c$. Near its rear end this plate $c$ has guiding lugs or projections 2 3, separated from each other, as shown in Figs. 3 and 4, to form between their walls a guideway for the finger $d$, pivoted at $d^2$ on an ear of the bracket $f$, the rear end, $d^3$, of the finger, by its contact with the under side of bracket $f$, (see Fig. 5,) determining the descent of the front end of finger $d$.

The projections 2 3 are open at their sides, as shown in Figs. 2, 5, and 6, for the passage through them of the head $c^5$ of the lever $c^3$, it having an inclined face, 4, (clearly shown in Fig. 3,) against which strikes the end of the finger $d$, when the weft-thread is broken or fails to hold up the feeler $e$ as the lay is moving over the first portions of its course on its way forward, to cause the reed (not shown) to beat up the weft at the fell of the cloth. The lay has connected with it the bracket $f$, which carries the pivot $g$ for the feeler $e$, the latter being shown as composed of a forked wire, attached by a screw, 6, to a block or hub, $g^2$, one part of which is extended toward the center of the lay, and has a pin, $g^3$, which sustains the link $g^4$, that at its lower end is joined by pin 7 with lifting-lever $h$, pivoted on a pin, 8, in an ear of the bracket $f$. This lever $h$ has a projection, 12, which, as the lay is moved backward, rides along over the top of adjustable guide $n$, made as a lever or arm, pivoted at 14, on an ear, $n^4$, of the plate $c$. The said guide $n$ is slotted, as shown clearly at 15, Fig. 6, to receive through it a bolt, 20, screwed into a part of the plate $c$, and has a lug, 16, at its rear side, and immediately below the said lug is an adjustable screw, $n^2$, held in an ear, $n^3$, of plate $c$. When the bolt 20 is loosened, the guide may be raised or lowered by turning the screw $n^2$ in the proper direction. The position of the upper right-hand end of the guide $n$ (see Fig. 2) determines the extent of upward movement of the rear end of lever $h$, and consequently the upward throw of the feeler $e$ at the backward position of the lay, while the shuttle crosses it to deposit the weft or filling between the warp. Lever $h$ has its rear end convexed, as at 21, (see Fig. 8,) in the arc of a circle described about its pivot 8, and is provided with a notch, 22, and a toe, 23. The finger $d$ next the lever $h$ is provided with a concaved recess, 24, a notch, 25, shoulder 29, and a projection, 26. The convexed end of lever $h$ rests in the concaved recess 24 of the finger $d$, and during the upward motion of the lever $h$ from the position shown in Fig. 5 the corner 30 comes in contact with the under side of the projection 26 of the finger $d$ and lifts the latter until the corner 30 of the lever passes the point of the said projection, after which the lever holds the finger without movement. At the same time the concave surface 24 of the finger comes in contact with the convex surface 21 of the lever $h$, and prevents the finger $d$ from rising beyond the position imparted to it by the corner 30 of the lever $h$ acting against the projection 26 of the finger, notwithstanding the lever continues to rise to the position to which the guide $n$ will carry it. The finger $d$ will remain at rest with its point just above the level of the top of the end $c^5$ of the dagger-lever $c^3$, and the said lever $h$, while the weft-feeler is held by the weft in the plane of the dotted line in Fig. 5, prevents the finger $d$ from descending low enough to turn the lever $c^3$ as the lay 21 is moved forward. Should the weft be absent, the feeler $e$, unsupported by it, will drop below the position of the dotted line 28, Fig. 5, and the corner 30 of the curved end of the lever $h$ will drop below the projection 26, which permits the finger $d$ to drop by reason of its weight; but to positively insure the descent of the finger $d$ in the proper time, we have provided the lever $h$ with the toe 23, which strikes the shoulder 29 of the finger $d$ and throws it down quickly, so that the latter, as the lay is moved forward, will strike the inclined face 4 of the head $c^5$ of lever $c^3$, and cause the said lever to be turned about its fulcrum, the stud $c^4$, and stop the loom. As the portion 12 of the lever $h$ during the backward movement of the lay travels up along the top of the guide $n$, the corner 30 of the said lever, striking the toe 26 of the finger, will lift the latter; but by the time that the end of the finger has been sufficiently elevated to be above the end $c^5$ of the lever $c^3$, the toe 26 thereof rests on the curved surface of the lever $h$, after which further elevation of the lever $h$, instead of lifting the finger, will hold it at rest. The recess 22 allows traveling space for the projection or toe 26.

The shoulder 29 referred to may be omitted; yet it is desirable to retain it to insure positive downward movement of the finger $d$. The lever $c^3$, at its front end, has an arm, $p$, connected with it by bolt 19, which arm, when the shipper-lever $m'$ is locked in the notch of its usual holding-plate $r'$, rests against the adjustable lug $p^2$ on the rod $s'$, and consequently when the lever $c^3$ is vibrated by the action of the finger $d$ against its head $c^5$ the arm $p$, by its pressure against the block $p^2$ of the rod $s'$, turns the piece $e^2$, as described in the patent hereinbefore mentioned, and forces the shipper-lever $m'$ out of its holding-notch. The shipper-lever, when released from the notch of plate $r'$, will through other levers, as described in the said patent, operate to shift the driving-belt and stop the loom.

The block or hub $g^2$ (shown best in Figs. 9 and 10) is of sufficient diameter to have made in it suitable holes for the reception of the feeler-wires, and that part of the feeler at the side of the said block nearest the breast-beam is bent at right angles against the block, as shown, thus forming a loop or eye, as shown in Fig. 9, through which and into a threaded hole in the block is inserted the screw 6, which connects the feeler $e$ with the said block. The warp-threads in line with the feeler rest upon the upper rounded side of the block or hub $g^2$, or upon a shield, 40, attached thereto, thus forming a smooth unobstructed surface for contact with the warp-threads as the lay is being reciprocated. This shield (shown in Fig. 10, it being omitted from all the Figs. 1 to 9, inclusive, to avoid confusion) shields the head of the screw 6, so that the warp-threads cannot catch it.

In Figs. 11 and 12 we have secured the connected end of the feeler upon the upper side of the block or hub $g^2$, and in such modification the shield for the screw is attached to the side of the hub nearest the breast-beam, and the shield projects backward instead of forward, as in Fig. 10.

We claim—

1. The lay, the feeler $e$, its block or hub, pivoted link $g^4$, lever $h$, means for operating said lever, and the finger $d$, combined with plate $c$, the lever $c^3$, to be moved by the said finger, a support for the plate, the shipper-lever, arm $p$, and means between the arm $p$ and shipper-lever to release the shipper-lever, substantially as described.

2. The shipper-lever, the pivoted lever $c^3$, provided with a head having an inclined face, a plate to hold the lever, and means to support the plate, combined with the lay, the finger, and lever, means for operating said lever, the link, the feeler, and its block or hub, and means for operating the shipper-lever from the said lever $c^3$, substantially as and for the purpose described.

3. The guide $n$, means to support it, the lay, the lever provided with the projection to come in contact with the said guide, and the link, and feeler and its block or hub, combined with the finger connected with and operated by the said lever, substantially as described.

4. The plate $a$, adapted to be connected with the breast-beam, the vertically-adjustable bracket $a^2$, having the base $a^3$, and the shoe $b'$, combined with the plate $c$, the lever $c^2$, pivoted thereon, having the head $c^5$, the lay, the finger $d$, the feeler, means to operate it, and means for connecting the feeler with the finger $d$, substantially as described.

5. The lay, the lever $h$, having the curved surface 21 and corner 30, the feeler, and means to connect the feeler with the said lever and move the lever, combined with the finger $d$, having the recess 24, and the projection or toe 26, to operate substantially as described.

6. The lay, the lever $h$, having the curved surface 21, corner 30, and toe 23, the feeler, and means to connect the lever and feeler and operate the lever, combined with the pivoted finger having the recess 24, and projection 26, to operate substantially as described.

7. The guide-plate $a$, adapted to be attached to the breast-beam of a loom, the bracket $a^2$, having the foot $a^3$, adapted to be adjusted vertically, the base-plate adapted to be adjusted laterally, and the guide $n$ on said base plate, combined with the bracket $f$, adapted to be attached to the lay, the feeler carried by the said bracket, and means connected with the feeler, and adapted to be moved by the guide to turn the feeler, substantially as described.

8. The guide-plate $a$, adapted to be attached to the breast-beam of a loom, the bracket $a^2$, having a foot, $a^3$, and adapted to be adjusted vertically, the base-plate $c$, adapted to be adjusted horizontally with relation to the foot of the said bracket, the dagger-lever pivoted on the said base-plate, and the guide $n$, combined with the bracket $f$, adapted to be attached to the lay, the feeler, and means connected with it to be acted upon by the guide to lift the feeler, and to strike the dagger-lever when the feeler is in its lowest position and the weft is absent, and with the shipper-lever, and means between it and the dagger-lever to enable the latter to determine the release of the shipper-lever, substantially as described.

9. The guide-plate $a$, adapted to be attached to the breast-beam, the bracket $a^2$, provided with a foot, and adapted to be adjusted vertically, a base-plate, and the guide $n$, supported by it, combined with the bracket $f$, adapted to be attached to the lay, a feeler carried by the said bracket, and means to enable the feeler to be moved by the said guide, substantially as described.

10. The guide-plate $a$, adapted to be attached to the breast-beam, the bracket $a^2$, provided with the foot, the base-plate adapted to be adjusted laterally or toward the loom side, and the guide $n$, supported by the said base-plate, combined with the bracket $f$, adapted to be supported by the lay, the feeler, and means to operate the feeler from the said guide as the lay is reciprocated, substantially as described.

11. The bracket $f$, the pivoted hub or block, the feeler-wire, and the screw 6, to keep the feeler-wire in place on the said block or hub, combined with the shield to cover the said screw, substantially as described.

In testimony whereof we have signed our names to this specification in the presence of two subscribing witnesses.

GEO. CROMPTON.
HORACE WYMAN.

Witnesses:
CHAS. H. EDWARDS,
J. B. SYME.